US008126589B1

(12) United States Patent
Parker

(10) Patent No.: US 8,126,589 B1
(45) Date of Patent: Feb. 28, 2012

(54) METHOD AND APPARATUS FOR A BEVERAGE AND CONTAINER VENDING MACHINE

(75) Inventor: Caryn Parker, Tahoe City, CA (US)

(73) Assignee: Ecowell, Inc., Pullman, WA (US)

( * ) Notice: Subject to any disclaimer, the term of this patent is extended or adjusted under 35 U.S.C. 154(b) by 443 days.

(21) Appl. No.: 12/256,062

(22) Filed: Oct. 22, 2008

(51) Int. Cl.
*G06F 17/00* (2006.01)

(52) U.S. Cl. ........................ 700/239; 221/96; 222/129.1

(58) Field of Classification Search .................... 221/96; 700/239; 222/129.1
See application file for complete search history.

(56) References Cited

U.S. PATENT DOCUMENTS 3,295,998 A * 1/1967 Goros ............................ 222/86
4,160,727 A 7/1979 Harris, Jr.
4,528,093 A 7/1985 Winer
4,623,467 A 11/1986 Hamlin
4,962,866 A * 10/1990 Phillips ...................... 222/129.4
4,969,991 A 11/1990 Valadez
5,373,874 A 12/1994 Shieh
5,443,739 A 8/1995 Vogel et al.
5,582,717 A 12/1996 Di Santo
5,782,380 A 7/1998 DiSanto
5,817,231 A 10/1998 Souza
6,102,246 A * 8/2000 Goulet et al. ................... 221/11
6,116,460 A * 9/2000 Kim et al. ....................... 221/96
6,149,031 A 11/2000 Bauman et al.
6,230,930 B1 5/2001 Sorensen et al.
6,513,677 B1 2/2003 Sorensen et al.
6,600,968 B2 * 7/2003 Sudolcan et al. ............. 700/236
6,772,944 B2 * 8/2004 Brown .......................... 700/213
6,848,600 B1 * 2/2005 Crisp, III ................... 222/129.1
7,043,934 B2 5/2006 Radermacher et al.
7,231,279 B2 * 6/2007 Ghidotti ........................ 700/239
2002/0012689 A1 1/2002 Stillman
2007/0012719 A1 1/2007 Holler
2008/0052094 A1 2/2008 Morfopoulos et al.

* cited by examiner

*Primary Examiner* — Timothy Waggoner
(74) *Attorney, Agent, or Firm* — Lewis and Roca LLP

(57) ABSTRACT

A vending machine for the distribution of beverages. The vending machine may also dispense a reusable beverage container. The vending machine may also fill a container purchased from the machine or provided by a user.

13 Claims, 2 Drawing Sheets

METHOD AND APPARATUS FOR A BEVERAGE AND CONTAINER VENDING MACHINE

FIELD OF THE INVENTION

The present invention relates to vending methods and apparatus for the purpose of delivering beverages to a user. More particularly, the present invention relates to a beverage vending apparatus and method that gives the user the option of purchasing a reusable beverage container or providing her own container.

BACKGROUND OF THE INVENTION

There are a number of vending machines available to consumers. For example, a consumer may purchase bottled beverages, including soft drinks and water, coffee, etc. Among these options, bottled water has become more and more popular as a fast, safe, and convenient way to get water. However, there are negative aspects to the use of disposable plastic water bottles. Although a fraction of bottles are recycled or reused when emptied, a good number of the bottles are either thrown away or improperly disposed of (e.g., by littering). In addition, though a fraction of the bottles may be recycled, it takes valuable resources to recycle those bottles and they never become new bottles again.

Many people have taken to carrying personal water bottles around to deal with these issues. However, options are lacking for obtaining safe and clean water quickly when an individual is away from home. Therefore, it would be desirable to provide options for people to refill their personal water bottles.

SUMMARY OF THE INVENTION

The present invention comprises a vending apparatus and method that gives a user the option to purchase a beverage such as water, a reusable beverage container, or both.

In one exemplary embodiment of the present invention, a user may choose to purchase a beverage container such as a water bottle from a vending machine. There may be multiple styles of reusable bottles or other reusable containers to choose from, including a variety of sizes, materials, etc.

In another embodiment of the present invention, the vending machine will fill a beverage container such as a bottle with a beverage such as water. The bottle may be purchased from the vending machine or may be a personal container such as a water bottle belonging to the user. The beverage dispensed from the vending machine may be water from any municipal source. In addition, the water may be filtered as is known in the art, for example, by a reverse osmosis system. Furthermore, a system such as an ultra violet light system may be used to kill bacteria, viruses, and other microorganisms that may be present in the water as is known in the art.

In yet another embodiment of the present invention, additives may be added by the vending machine to the water or other vended beverage, or vended separately. Such additives include, but are not limited to, carbonation, flavors, vitamins, minerals, energy boosters, powdered drink mixes (e.g. tea or lemonade), alkaline additives, and the like.

Payment may be made using cash, or credit/debit cards as known in the art.

For a more complete understanding of the nature and various advantages of the present invention, reference should be made to the ensuing detailed description and claims, taken in conjunction with the accompanying drawings.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

Figure 1:
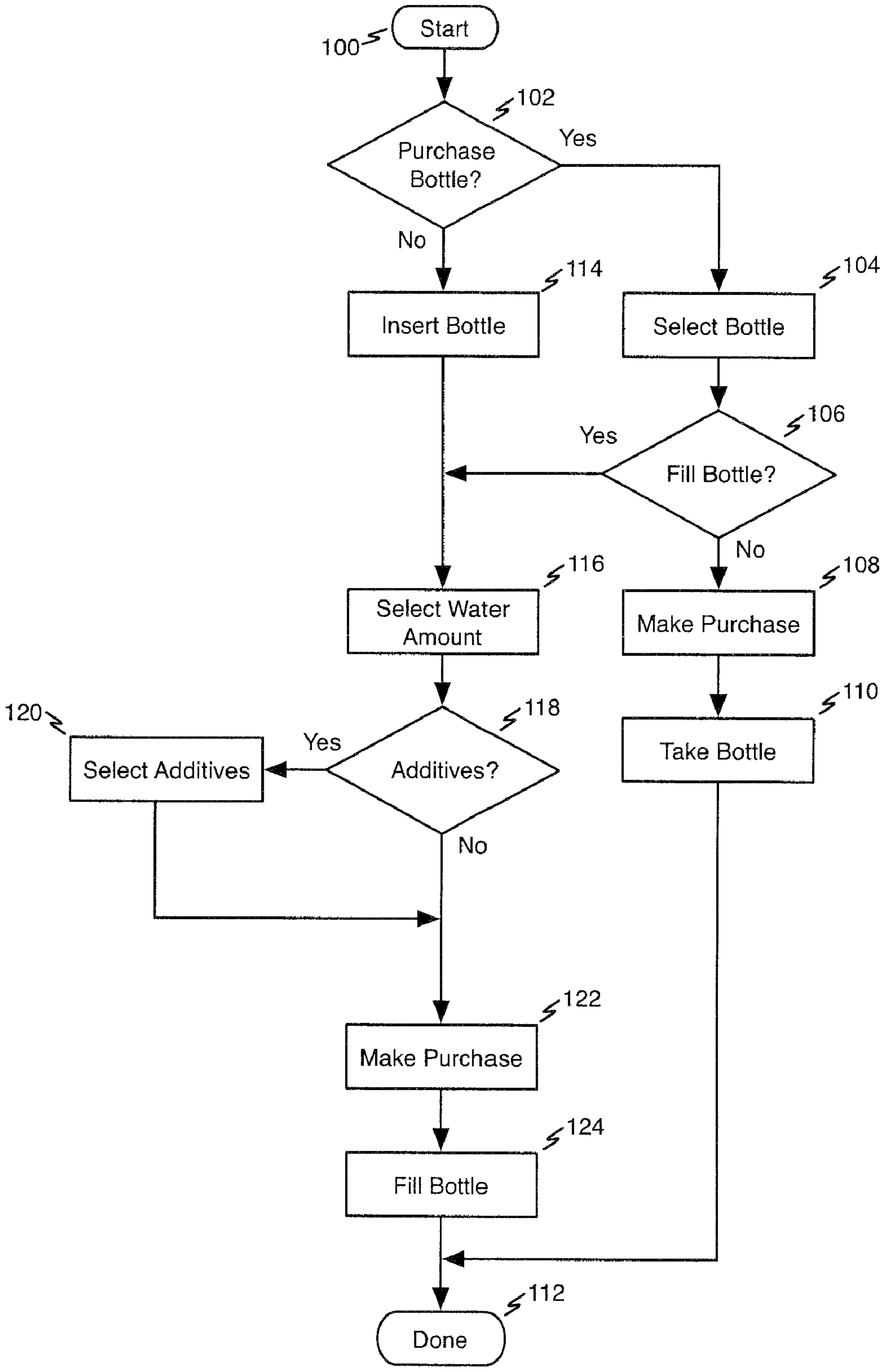
FIG. 1 is a flow diagram illustrating aspects of an exemplary embodiment in accordance with the present invention.

In the following description, numerous specific details are set forth in order to provide a more thorough description of the present invention. It will be apparent, however, to one skilled in the art, that the present invention may be practiced without these specific details. Other embodiments of the invention will readily suggest themselves to such skilled persons having the benefit of this disclosure. In some instances, well-known features have not been described in detail so as not to obscure the invention.

The present invention comprises an apparatus, such as a vending machine, for dispensing beverages into refillable containers such as bottles. The vending machine is capable of both vending a beverage and a container in which to put it, as well as accepting and filling a consumer-supplied container. Exemplary beverages include water, juices, sodas, and the like. The apparatus, in some embodiments, allows the consumer to select additives to be added to the beverage such as carbonation, vitamins, minerals, caffeine, flavors, and so forth.

According to an exemplary embodiment of the present invention, a vending machine offers a user the option to purchase a beverage, a bottle, or both. The machine may be configured to take payment through a variety of means. For example, the machine may take coins, cash, or credit/debit cards. The machine may take any form of payment that is now known or hereinafter developed.

The vending machine according to the present invention provides the user an opportunity to purchase a container such as a bottle from the machine. In various embodiments of the present invention, the user may select from a variety of different bottles. For example, the user may be able to select from a variety of sizes of water bottles. In another embodiment the user may be able to select from a series of reusable water bottles. These reusable bottles are preferably non-toxic and will not leach harmful chemicals, such as, for example, Bisphenol A (BPA). In one exemplary embodiment, non-toxic leaching stainless steel bottles having a capacity of approximately 750 ml may be used.

A vending machine according to the present invention may dispense containers formed from many different materials. Illustrative non-limiting examples from which containers may be formed include glass, metal, ceramic or plastic. In one exemplary embodiment of the present invention, the vending machine will dispense plastic bottles.

Additionally, according to another embodiment of the present invention, the vending machine will offer for sale to the user stylized containers such as reusable athletic-type bottles and the like.

According to aspects of an exemplary embodiment of the present invention, the vending machine may offer more than one size, and/or type of container or bottle. In addition, the vending machine may have a selection of the same type of bottles or other containers, each with a different design.

After the user selects the bottle or other container of her choosing, the user may elect to have the machine dispense the chosen bottle or other container unfilled or, alternatively, the user may choose to have the machine fill the chosen bottle or other container with water or some other beverage.

In addition, if a user already has a bottle or other container, she may choose to purchase water only and can insert the user-provided bottle or other container into the machine (thereby opting not to purchase a bottle or other container from the vending machine) in order to fill it with water or other beverage.

If the user wants the container to be filled by the machine, or if the user inserts her own bottle or other container into the machine to be filled, the machine may prompt the user to specify an amount of beverage to dispense. Alternatively, the vending machine may identify the fill amount by the type of bottle or other container chosen by the user.

After the user places the bottle in the dispensing bay, the machine proceeds to fill the bottle with a liquid beverage. In one illustrative embodiment, the beverage is water. In some embodiments, the vending machine will be equipped to filter and/or purify the water before filling the bottle. In an exemplary embodiment of the present invention, the water is filtered by reverse osmosis and/or is exposed to ultra violet light. By having such a filtering system, the machine is able to utilize water from any municipal water supply to dispense clean drinking water.

In some embodiments, the user may also select whether she wants to add any additives to the water. This may be done without charge or for a fee specified by the machine. Examples of additives include, for example, carbonation, flavors, vitamins, minerals, energy boosters, powdered drink mixes (e.g. tea or lemonade), alkaline additives, and the like. In some embodiments, such additives may be blended with the beverage as it is being dispensed or may be delivered to the user in the form of, for example, sealed flavor packets that the user can then add to the beverage. Optionally, the vending machine may be configured to vend only additives to the user.

After making all of the necessary selections, the user may complete the purchase using cash or a credit or debit card as is known in the vending art.

After the purchase transaction has been completed, the vending machine dispenses the container if the user has purchased one. If the user has chosen to purchase a beverage, she may then place the purchased container or a container she has provided into the dispensing bay where the beverage and any additives are dispensed into the container.

A process by which an exemplary embodiment of the present invention dispenses bottles and/or water is shown in the diagram of FIG. 1. The process starts at reference numeral 100. The illustrative embodiment of FIG. 1 relates to the purchase of water, but persons of ordinary skill in the art will appreciate that the present invention is not limited to the purchase of water and/or a bottle and that the purchase of other beverages and/or containers is contemplated within the scope of the present invention.

With reference to FIG. 1, a user will approach a vending machine according the present invention. The user will have many options when making her purchase. The first option exercised by a user, as shown at reference numeral 102, is to decide whether to purchase a bottle. If the user has chosen to purchase a bottle, the process proceeds to reference numeral 104, where the user chooses a bottle from among the available choices. In some embodiments, there may be only one choice available in which case choosing a particular bottle is unnecessary. Next, the process proceeds to reference numeral 106, where the user decides whether to purchase a beverage to place into the bottle. If not, the process proceeds to reference numeral 108, where the user performs the purchase transaction by inserting cash or a credit/debit card into the machine and following prompts as is known in the art. Next, the process proceeds to reference numeral 110, where the user removes the purchased bottle from the bottle dispensing bay of the machine.

If the user decides not to purchase a bottle at reference numeral 102, the process proceeds to reference numeral 114, or the user has chosen at reference numeral 106 to fill a just-purchased bottle, where the user inserts the bottle into the beverage dispensing station of the machine. Next, at reference numeral 116, the user may decide to select an amount of beverage to purchase. In some embodiments of the invention, the machine may employ sensors to determine the size of the bottle inserted into the beverage dispensing bay or may be configured to dispense a fixed amount of the beverage, making such selection unnecessary.

In other embodiments, the vending machine may include one or more sensors to determine when a bottle is full and stop dispensing the beverage when the bottle is filled. For example, the machine may be able to detect water that is approaching the top of the bottle, thus determining that the bottle is full. This would enable the user to instruct the machine to fill the bottle, whether the bottle was purchased from the machine or is provided by the user. It should be noted that any of the many known and available sensors may be used by the machine to detect whether a bottle is full.

After a user has selected a container to purchase, the process proceeds to reference numeral 118, where the user decides whether to purchase any additives. Examples of additives include, but are not limited to, flavors, vitamins, minerals, energy boosters, powdered drink mixes (e.g. tea or lemonade), alkaline additives, and the like. Next, at reference numeral 120, particular additives are selected by the user. In some embodiments, the user may elect to purchase only additives, which can be separately dispensed from the vending machine.

Next, if the user has decided not to purchase additives at reference numeral 118, or has selected additives to purchase at reference numeral 120, the process proceeds to reference numeral 122, where the purchase transaction is accomplished. The purchase transaction at reference numeral 122 can be the same as the transaction at reference numeral 108.

Next, at reference numeral 124, the container is filled at the beverage dispensing bay of the machine. The process then ends at reference numeral 112.

Figure 2:
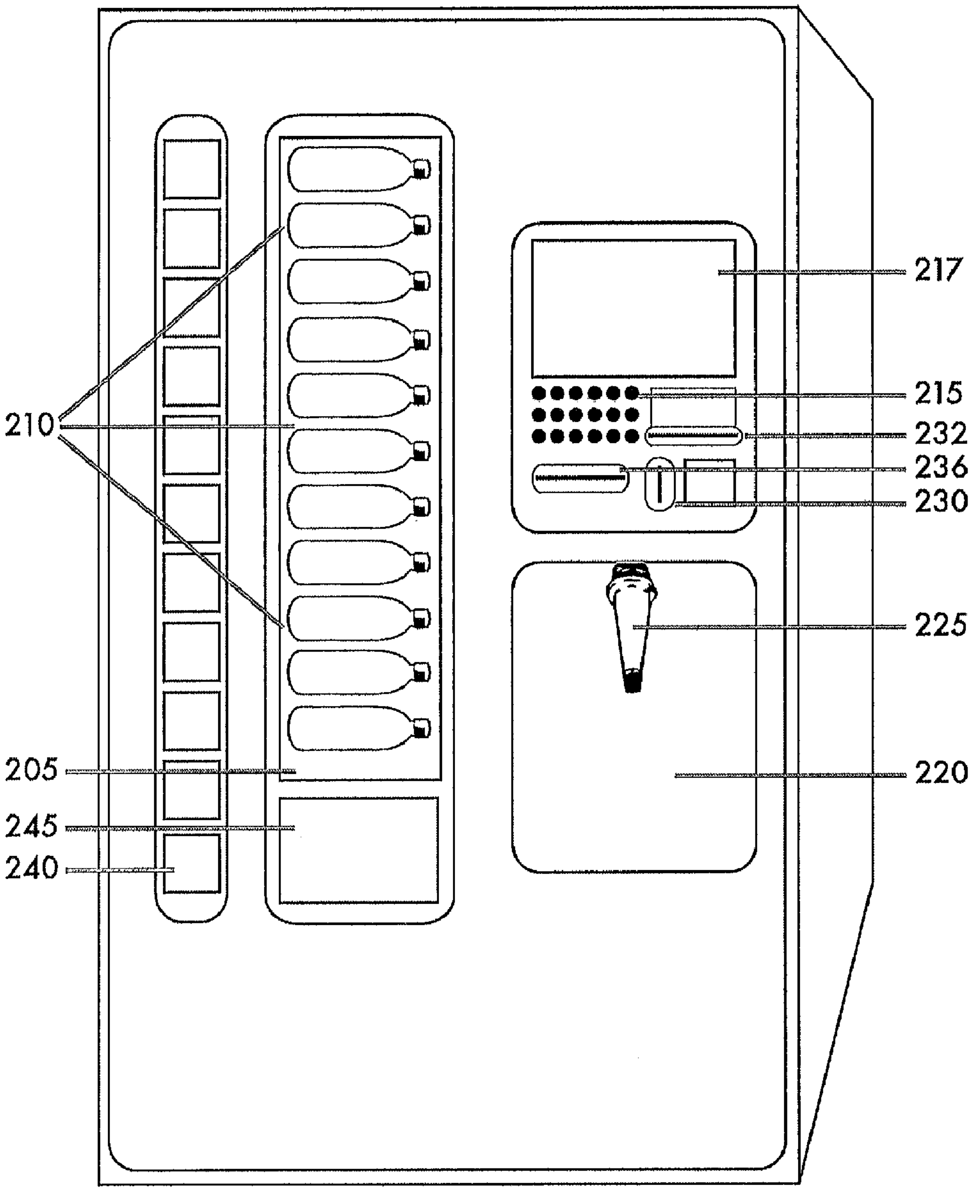
FIG. 2 is a schematic representation of an exemplary embodiment of the present invention.

An exemplary embodiment of a vending machine 200 that may be used to perform the process described with reference to FIG. 1 is depicted in FIG. 2. Vending machine 200 displays bottles 210 that may be purchased from the machine. As shown above, these bottles may come in different varieties and/or sizes. The bottles 210 may be visible through display glass 205. A user of machine 200 may make her selections by using control pad 215. Examples of selections made on the control pad 215 include, for example, whether to purchase a bottle, what bottle to purchase, whether to fill the bottle, how much beverage to place in the bottle, and whether the user wants any additives.

Control pad 215 may also comprise a readable display screen 217. The readable display screen 217 will provide the user with any instructions that she may need, provide the cost of the selections, and any other information that needs to be communicated to the user. When the display screen 217 instructs the user to pay, the user may insert coins in coin slot 230, cash in money slot 236, or a credit/debit card in card reader 232.

Once a selection had been made, machine 200 may deliver the container to bottle bay 220 or 245. If the container is not going to be filled, the user may simply take her new container with her. However, if the container is to be filled, or if the user places her own container into beverage dispensing bay 220 to be filled, the container is filled via spout 225. In addition, spout 225 may also insert additives into the beverage. After completion of the filling, the user may taker her filled container, and any additives that may have been dispensed separately.

Although several preferred embodiments of the present invention have been described in detail herein, it is to be understood that the invention is not limited to these precise embodiments, and that various changes and modifications may be made by one skilled in the art without departing from the scope or spirit of the invention.

What is claimed is:

1. A beverage vending machine comprising:

a beverage dispensing bay;

a beverage dispensing unit configured to dispense a beverage within the beverage dispensing bay;

a beverage container storage unit configured to hold a plurality of empty beverage containers;

a container positioning mechanism configured to convey an empty beverage container from the beverage container storage unit and into a container dispensing bay;

a user interface configured to display instructions and receive user selections and payment; and a controller coupled to the beverage dispensing unit, the beverage container storage unit, and the container positioning mechanism, the controller configured to receive a user selection from the user interface, to control the beverage dispensing unit in response to a user selection quantity of beverage and sensing the presence of a beverage container in the beverage dispensing bay, and to cause the container positioning mechanism to dispense an empty beverage container into the container dispensing bay in response to a user making a selection to receive a beverage container.

2. The beverage vending machine of claim 1 further including:

an additive dispensing unit configured to dispense at least one beverage additive; and wherein the additive dispensing unit is responsive to selection made by a user at the user interface to dispense the at least one beverage additive.

3. The beverage vending machine of claim 2 wherein the additive dispensing unit dispenses the at least one beverage additive from an additive dispensing bay.

4. The beverage vending machine of claim 2 wherein the additive dispensing unit dispenses the at least one beverage additive into the beverage at the beverage dispensing bay.

5. The beverage vending machine of claim 1 wherein the container dispensing bay is located at the beverage dispensing bay and wherein the container positioning mechanism is configured to convey an empty beverage container from the storage unit and into the beverage dispensing bay such that the beverage container is positioned to receive the beverage dispensed from the beverage dispenser.

6. The beverage vending machine of claim 1 wherein the controller receives user selections of at least a container, a beverage, and a quantity of the beverage.

7. The beverage vending machine of claim 2 wherein the controller receives user selections of at least a container, a beverage, a quantity of the beverage, and at least one additive.

8. The beverage vending machine of claim 1 further including a sensor coupled to the controller for shutting off the beverage flow in response to a signal indicating that a container receiving dispensed beverage is at a preselected.

9. A method for dispensing a beverage, including:

receiving a user selection of a container;

receiving a user selection of a beverage;

receiving a user selection of a quantity of the beverage;

conveying an empty vended beverage container from a beverage container storage unit to a container dispensing bay in response to an input from a user electing to receive a container, otherwise receiving a user-supplied beverage container; and dispensing the quantity of the beverage into one of the empty vended beverage container and the user-supplied beverage container.

10. The method of claim 9 wherein dispensing the quantity of the beverage into one of the empty vended beverage container and the user-supplied beverage container includes first detecting a beverage container within a dispensing bay of a vending machine.

11. The method of claim 9 further including:

receiving a user selection of at least one beverage additive; and dispensing the at least one beverage additive.

12. The method of claim 11 wherein dispensing the at least one beverage additive includes dispensing the at least one beverage additive with the beverage into one of the empty beverage container and the user-supplied beverage container.

13. The method of claim 11 wherein dispensing the at least one beverage additive includes dispensing the at least one beverage additive separately from the beverage.

* * * * *